United States Patent Office 3,655,803
Patented Apr. 11, 1972

---

3,655,803
PROCESS FOR PRODUCING ALPHA-PINENE OF LOW SULFUR CONTENT FROM CRUDE SULFATE TURPENTINE
Frank L. Miller, P.O. Box 389, Jacksonville, Fla. 32201
Filed Sept. 28, 1970, Ser. No. 76,003
Int. Cl. C07c *13/00;* C09f *3/02*
U.S. Cl. 260—675.5                                  6 Claims

ABSTRACT OF THE DISCLOSURE

α-Pinene product of low sulfur content is produced by continuously fractionally distilling crude sulfate turpentine at a pressure not substantially above atmospheric into a sulfur-rich overhead distillate fraction having α-pinene content between 2 and 20 weight percent and a bottoms fraction of higher boiling materials, and fractionally distilling said bottoms fraction to recover said product as an α-pinene distillate fraction.

---

This invention relates to an improved method for producing α-pinene product of low sulfur content from crude sulfate turpentine. Advantages over prior proposals for producing such product include substantial economy, simplicity of process control, and collection of odoriferous waste products in a form amenable for their economic disposal.

This process comprises:
continuously feeding into a fractional distillation zone crude sulfate turpentine and in said zone fractionally distilling said crude sulfate turpentine at a pressure not substantially in excess of atmospheric pressure into:

an overhead distillate fraction rich in low boiling sulfur compounds and having an α-pinene content between about 2 and about 20 weight percent; and,
a bottoms fraction comprising higher boiling materials;

continuously withdrawing from said fractional distillation zone said overhead distillate fraction and said bottoms fraction; and
fractionally distilling said bottoms fraction at reduced pressure for obtaining as said product an α-pinene distillate fraction.

Figure 1:
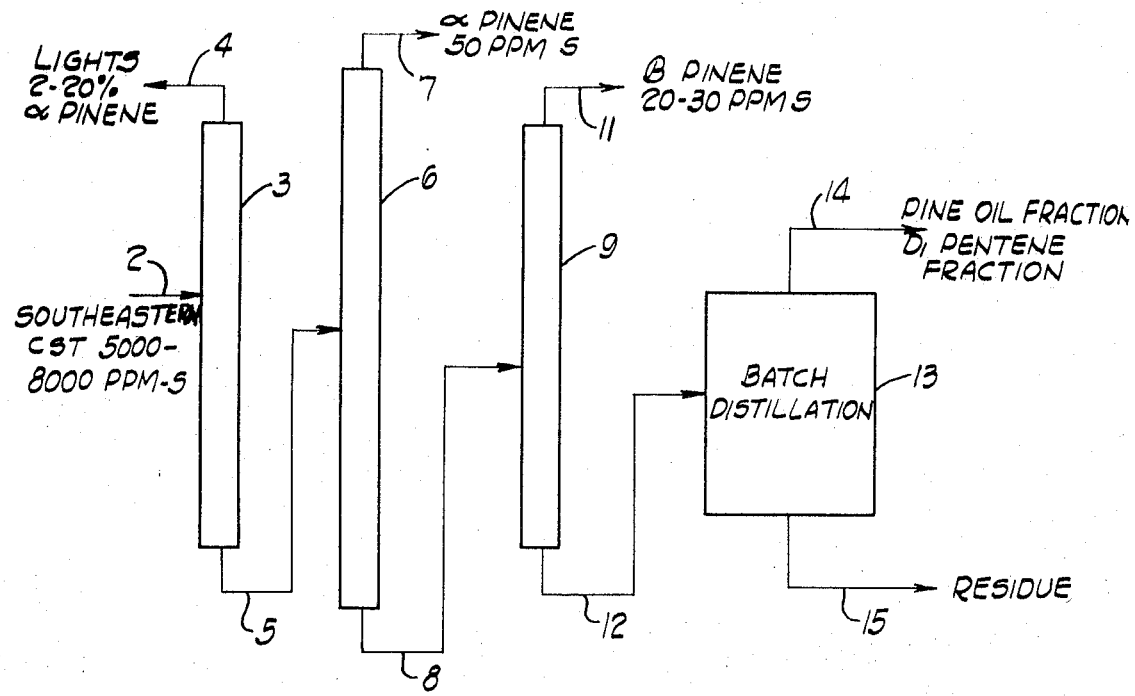

The drawings are flow diagrams showing the basis of design for a processing plant nominally designed to take a feed of 10,000 gallons per day of crude sulfate turpentine from southeastern (FIG. 1) and northwestern (FIG. 1 with column 9 replaced by column 17 of FIG. 2) source. The drawings do not show pumps, valves, condensers, reflux splitters and returns, heaters, coolers, reboilers, flow redistributors, vacuum jets, heat insulation, instrumentation, utility connections, or holding tanks. Such equipment is conventional, and is provided where necessary or desirable in accordance with conventional practice. The drawings are more fully discussed in connection with the following examples.

Crude sulfate turpentine is the product of kraft pulping of various woods, particularly the southern pine, other pines, hemlocks, and other woods of the species pinaceae. Crude sulfate turpentine, also conveniently referred to as CST, generally contains a high concentration (5000 p.p.m. and above) of indigenous sulfur compounds. Typical sulfur compounds are organic sulfides and mercaptans. They impart objectionable odor to, and otherwise impair the quality and usefulness of, the resultant turpentine and its fractions. Components in CST include α-pinene, β-pinene (generally only in southeastern CST, also few CST's from Greece, New Zealand and other places), β-phellandrene, myrcene, camphene, carene, limonene, etc. A detailed description of U.S. and Canadian turpentines is found in the text "Turpentines From The Pulp Woods of United States and Canada" by Drew and Pylant, appearing in TAPPI, vol. 49, No. 10, October 1966, pp. 430–438. In reactions of α-pinene conventionally recovered from CST, the kind and proportion of sulfur compounds usually is deleterious, and it can poison catalysts used in the isomerization of such α-pinene to the more valuable β-pinene.

Preferred CST for my purposes is a southeastern United States CTS; the α-pinene recovered in my process from such stock advantageously has not over 150 p.p.m. sulfur content and can be as low as 50 or even lower. Other good stocks for my process are northwestern (United States) and western Canada CST which ordinarily is similar. Such CST has generally four or less percent β-pinene and a fair amount of delta-3-carene. For purposes of my invention Scandinavian CST is substantially like northwestern CST.

The sulfur in such northwestern and like CST's is more difficult to remove; a good α-pinene product from my process with such stock will contain not more than about 400 p.p.m. sulfur, and this can be substantially lower with good operation, e.g. as low as 200 p.p.m. sulfur.

A key operation in my process is the continuous fractional distillation of the crude sulfate turpentine wherein such turpentine is continuously fed into a continuous fractional distillation zone, i.e. a column, and there is withdrawn continuously from said zone an overhead distillate fraction rich in low boiling sulfur compounds and a bottoms fraction comprising a higher boiling material. In this step the operating pressure should not be substantially above about atmospheric (760 mm. Hg) to suppress and retard plugging of the column with polymeric residues.

Preferably the distillation is run at about atmospheric pressure for efficiency and economy, but where there is adequate cooling water or other coolant for condensation, and reduced pressure equipment is available, this first distillation can be run at some advantage at pressures down to as low as about 200 mm. Hg absolute, although not without loss of distilling capacity and attendant greater equipment costs.

A specially important point in the first distillation is to maintain an overhead distillate drawoff flow having α-pinene content between about 2 and about 20, and advantageously between about 5 and about 10 weight percent α-pinene, for effectively purging the system of low boiling sulfur compounds in an efficient manner, but without excessive loss of α-pinene. As this stream is small, aggregating generally about 1%–2% of the total turpentine, the α-pinene losses here are insignificant. These light ends, that is the sulfur rich overhead distillate drawoff, ordinarily are burned in an efficient incinerator or mixed with boiler fuel for combustion.

The control of the α-pinene content of this distillate can be done by estimating the α-pinene content thereof directly by vapor phase chromatography of a sample. If the α-pinene content is too rich, one simply can throttle the drawoff of distillate and return more condensate to the distilling column as reflux. Alternatively, one can adjust by experience the volume of drawoff with known feed analysis of low boiling sulfur compounds and thus control the weight or volume of that distillate drawoff to remove approximately completely all these low boiling sulfur compounds with an attendant 2–20% content of α-pinene. A further alternative control mechanism involves observation of temperature above the feed point at the column (and generally near the top thereof). In atmospheric pressure operation, if the temperature near the top exceeds a predetermined value in the range of about 90–110° C. with constant heat input to the reboiler of the column, this would indicate too much α-pinene is in the distillate and the drawoff should be throttled. Conversely, when the temperature was substantially below such predetermined value, this would indicate too little α-pinene is purging the column of the low boiling sulfur compounds, and such drawoff flow should be increased.

The second fractional distillation, that of the bottoms fraction from the first distillation, can be done batchwise or preferably continuously for efficiency and economy. It must be done at reduced pressure, e.g. 100–300 and preferably to 200–250 mm. Hg top column pressure. In batch distillation one would feed to a reboiler or pot above which was located a rectifying column and take off appropriate distillate fractions including the α-pinene product fraction. For the fractionation in the preferred continuous distillation, feed is inserted in about the middle of the distilling column; the α-pinene is continuously rectified, enriched and withdrawn as α-pinene product of low sulfur content in the overhead distillate. The bottoms product of higher boiling materials is continuously withdrawn from the base of the column or the reboiler.

In the case of southeastern CST, this second bottoms fraction can be further fractionally distilled, preferably continuously, into an overhead distillate of β-pinene and a bottoms product of heavier materials. If done in batch this distillation is done from a pot or reboiler with a rectifying column situated thereabove, to take off appropriate distillate fractions including a β-pinene product fraction. The heavies (high boilers) from such subsequent β-pinene fractional distillation can further be fractionally distilled to recover natural pine oil, dipentene, etc. and leave high sulfur residues for blending into rosin oil or the like, or incineration.

In the case of northwestern CST and the like CST's, instead of recovering β-pinene from the second bottoms fraction, delta-3-carene is recovered in like manner (ordinarily in continuous fashion as an overhead distillate; the remainder of heavies is withdrawn as bottom fraction). Such bottoms ordinarily are subjected to a batch fractional distillation like the corresponding residues from southeastern CST. If such delta-3-carene desirably would be recovered batchwise, the batch apparatus similarly to that described for southeastern CST can be used.

The equipment and materials of construction for these operations is conventional, e.g. mild steel, austenitic stainless steel (particularly in heat exchanger tubes), and the like. The distilling columns preferred are packed, suitably with rings, saddles, and other conventional packing to maintain high capacity with low pressure drop. Alternatively, however, one can use bubble-cap plates, sieve plates, valve trays, etc.—indirect steam heat customarily is used to boil or reboil the materials in process although diphenyldiphenyl oxide mixtures and other conventional heat transfer agents also can be used, and even electrical heating elements can be used where electrical power costs are reasonable.

Condensation for product drawoff and reflux return to the distilling column ordinarily is done by indirect water cooling, although chilled water, air cooling and other conventional cooling methods can be used where feasible or desirable in conventional fashion. Reduced pressure is maintained preferably by use of steam jet ejectors, suitably single stage but multistage if necessary or desired, mechanical pumps, barometric legs, condensers and the like.

The α-pinene product from this process, often containing as low as 50 parts per million of sulfur or less, can be subjected to further desulfurization treatment to reduce the sulfur content to a form not substantially above about 10 p.p.m. and advantageously even lower, e.g. 2–5 p.p.m. or less. Typical of such processing includes the hypochlorite desulfurizing treatment described in detail in copending U.S. patent application 27,578 of Clayton B. Hamby et al., commonly assigned with this application, conventional hypochlorite desulfurization, copper treatment, sodium metal treatment, clathration of the sulfur bodies, e.g. by thiourea, and, advantageously, the Clayton B. Hamby activated carbon treatment (I-1591) suitably where the α-pinene is in liquid phase.

The following examples are reference to the drawings of this application. In this application, all temperatures are in degrees centigrade, all pressures in millimeters of mercury absolute, all parts are parts by weight, and all percentages are weight percentages unless otherwise expressly specified.

EXAMPLE 1

Southeastern CST containing 5000–8000 p.p.m. sulfur is fed at a steady rate of 10,000 gallons per 24 hour day through line 2 into about the center of continuous distilling column 3 operated at atmospheric pressure. Column 3 is packed with 2" carbon steel pall rings, the packed height being 35 feet, the I.D. being 12 inches. Overhead distillate vapors at about 1.6 g.p.m. ascend through column 3, are condensed in a water-cooled condenser (not shown). The condensate is passed into a decanter (not shown) where any water condensate adventitiously brought in with the CST to the system settles out and is drained off. The supernatant organics are returned for the most part to the top of the column as reflux. Distillate drawoff is maintained between about 0.007 and about 0.05 gallon per minute with between 5% and 10% α-pinene in it (as analyzed by vapor phase chromatography), the rate of distillate drawoff being controlled in response to maintaining said percentage of α-pinene. The temperature at the top of the column is 100°.

The thus-stripped bottoms are withdrawn from column 3 through line 5 and passed into about the center of distilling column 6, a 38" I.D. continuous distilling column having 180 feet, packed height, of 2" carbon steel pall rings. For structural purposes column 6 actually is a "split" column in two sections of about equal height with vapors leaving top of the first section and going into the bottom of the second section while liquid from the bottom of the second section is passed back to the top of the first section. This column is operated at 200–250 mm. Hg with steam jet ejection (not shown) to give an overhead distillate temperature of 105–110° at a reflux ratio of 8–10:1.

From the top of column 6 (actually the top of the second section) α-pinene distillate vapors pass through line 7, are condensed by an indirect water condenser (not shown), most of the distillate is returned as reflux, and the product drawoff having 50 p.p.m. sulfur and analysis of 1–2% β-pinene, 2–4% camphene, and balance α-pinene. This product can be used as such or further desulfurized as was described hereinbefore.

From the bottom of column 6 (actually the bottom of the first section) the pressure being about 500–600 mm. Hg in this zone, the bottoms of the α-pinene distillation are withdrawn through line 8 and pass into about the center of continuous distilling column 9 having 19" I.D. and 75 feet of packed height of carbon steel pall rings. The top of the column is maintained under 200–250 mm. Hg by steam jet ejection (not shown) and the overhead distillate, β-pinene of 90%, 2% α-pinene, 6% myrcene and 2% dipentene and 20 p.p.m. sulfur passes through line 11. The vapors are condensed by an indirect water-cooled condenser (not shown) with reflux at the ratio of 5:1 being returned to the top of the column and product drawoff being taken for usable β-pinene.

From the bottom of column 9 a bottoms fraction of "heavies" about 400–450 mm. Hg pressure is withdrawn from this zone through line 12 and stored in tanks (not shown). Periodically, the heavies are passed into a batch distillation apparatus 13 with a rectifying column operated at initially a top pressure of about 100 mm. Hg and top temperature of 100° and continuing, as distillate product fractions are taken, to a top temperature of about 150° C. and top pressure of 10–20 mm. Hg. Distillate cuts taken through outlet 14 are rich in natural pine oils (terpineols) and in dipentene. The residue, high in sulfur, is withdrawn through outlet 15. Ordinarily it is burned, but can be used as previously described.

EXAMPLE 2

In this operation northwest CST is passed continuously at a steady rate of 10,000 gallons per day through line 2 into column 3. The operation of the column is essentially the same as is described in Example 1 with an overhead distillate fraction rich in low boiling sulfur compounds being withdrawn as an overhead distillate and the bottoms fraction passing through line 5, and into column 6. Column 6 is operated essentially as described in Example 1, except that the α-pinene overhead product of 4 gallons per minute has 200–300 p.p.m. sulfur and analysis as follows: 85% α-pinene, 4% camphene, 8–10% β-pinene, 2–3% delta-3-carene.

Figure 2:
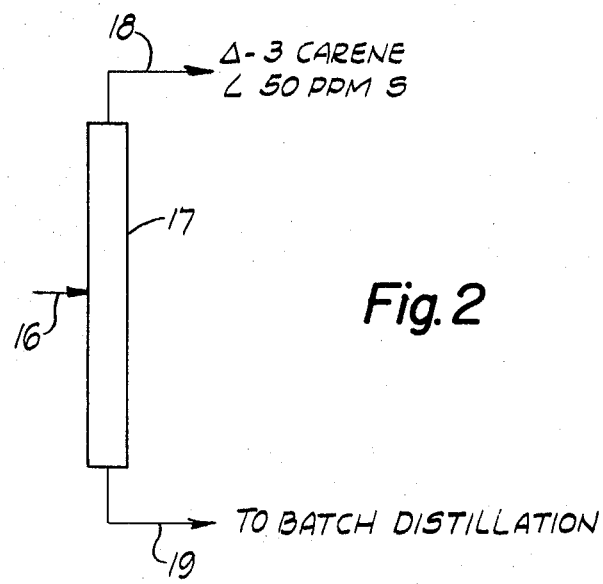

The bottoms from column 6, instead of being withdrawn through line 8, are referred to FIG. 2 and pass through line 16 into distilling column 17 which is structurally the same as column 9. This column is operated with 5 weight parts of reflux returning to the top of the column and one weight part of condensate, in this case a delta-3-carene fraction having analysis of 1–2% β-pinene, 80% delta-3-carene, balance dipentene, and about 40 p.p.m. sulfur. The column top temperature is 130°. Heavies from column 17 are continuously withdrawn as a bottoms fraction through line 19 and into storage (not shown). Periodically, heavies can be fractionally distilled continuously, or preferably batchwise in a manner similar to that of the heavies from line 12 in Example 1.

What is claimed is:

1. A process for producing α-pinene product of low sulfur content from crude sulfate turpentine which comprises:
   continuously feeding into a fractional distillation zone crude sulfate turpentine and in said zone fractionally distilling said crude sulfate turpentine at a pressure not substantially in excess of atmospheric pressure into:
       an overhead distillate fraction rich in low boiling sulfur compounds and having an α-pinene content between about 2 and about 20 weight percent; and,
       a bottoms fraction comprising higher boiling materials;
   continuously withdrawing from said fractional distillation zone said overhead distillate fraction and said bottoms fraction; and,
   fractionally distilling said bottoms fraction at reduced pressure for obtaining as said product an α-pinene distillate fraction.

2. The process of claim 1 wherein said crude sulfate turpentine is southeastern crude sulfate turpentine and said α-pinene product has not substantially in excess of about 150 p.p.m. sulfur content.

3. The process of claim 1 wherein said crude sulfate turpentine is northwestern crude sulfate turpentine and said α-pinene product has not substantially in excess of about 400 p.p.m. sulfur content.

4. The process of claim 1 wherein said first distillation is done at about atmospheric pressure.

5. The process of claim 1 wherein said first distillation is done at reduced pressure not substantially lower than about 200 mm. Hg absolute.

6. The process of claim 1 wherein said α-pinene product is subjected to further desulfurization treatment to reduce sulfur content to a value not substantially above about 10 p.p.m.

References Cited

UNITED STATES PATENTS

| | | | |
|---|---|---|---|
| 1,493,454 | 5/1924 | Jobson | 260—675.5 |
| 1,938,693 | 12/1933 | Gillespie et al. | 260—675.5 |
| 2,459,570 | 1/1949 | McGregor | 260—675.5 |
| 2,884,359 | 4/1959 | Bloom et al. | 203—73 X |
| 3,325,553 | 6/1967 | Derfer | 260—675.5 |

DELBERT E. GANTZ, Primary Examiner

G. E. SCHMITKONS, Assistant Examiner

U.S. Cl. X.R.

203—73